Patented July 13, 1937

2,086,793

UNITED STATES PATENT OFFICE 2,086,793

COMPOSITION FOR WATERPROOFING PERMEABLE MATERIAL

Constantine F. Fabian, Brookfield, Conn., and Alexander N. Sachanen, Luxembourg, Luxembourg, assignors, by mesne assignments, to The Non-Mercuric Carrot Company, Danbury, Conn., a corporation of Connecticut.

No Drawing. Application March 9, 1935, Serial No. 10,334

3 Claims. (Cl. 134—15)

This invention relates to processes for waterproofing textiles, felts, leather and other permeable materials and to waterproofing compositions adapted for such use. More particularly, the invention relates to processes and compositions which provide for a tight and uniform combination of waterproofing ingredients with the fibers or substances of which the materials are composed and which do not materially change or detrimentally affect the desirable physical properties of the materials, such, for example, as the color and softness of felts and their permeability to air, and which avoid imparting to such materials the property of stickiness or "tackiness" which is a characteristic of many waterproofing compositions heretofore employed.

It has been proposed to waterproof such materials as textiles and felts through the use of substances such as beeswax, paraffin, ceresin, resin, etc. This type of treatment, however, tends to effect changes in certain physical properties which are frequently undesirable for the use to which the materials are to be put. Thus, for example, textiles and felts as heretofore treated by these substances tend to assume an unnatural stiffness, losing softness, flexibility and pliability. In cases where a high concentration of these substances is used, especially in the presence of frequently used resins, these waterproofed materials become sticky or tacky. Furthermore, the use of paraffin or ceresin fails to give a tight adhesion to or absorption by the fibers of materials and felts and usually results in an uneven distribution of the waterproofing substance and a variation in the degree of waterproofing in different parts of the waterproofed material.

We have found that a satisfactory uniform waterproofing with a firm, tight adhesion to and absorption of the waterproofing ingredients by the waterproofed material, as well as the preservation of desirable physical properties of the textiles, felts, leather or other like permeable material, can be had by treating the same with mixtures of a petroleum oil as one component and a wax-like substance as another component, where one or more components of the mixture have been rendered electro-chemically active by sulphurization, the waterproofing mixture being dispersed in a volatile solvent, as by being dissolved in suitable organic solvents or emulsified in water, for application to the materials.

While the precise cause for such tight adhesion to and absorption by the fibers of textiles, felts and the like of electro-chemically active waxes and oils is obscure, we have found that these properties are promoted to a high degree by the chemical structure of the waxes and oils which have been sulphurated, which structure appears to be materially different from the structure of unsulphurated waxes and oils.

While our invention is not restricted by any theory which may be advanced to account for the precise action of the ingredients employed,—the main point being that they accomplish the results herein described,—the improvement resulting from the mixture herein described over the prior use of such substances as wax or the like for waterproofing, appears to be governed by the following properties of such ingredients and mixtures thereof.

The mineral waxes and oils are composed of hydrocarbons which are neutral from the electro-chemical point of view, and such substances of a neutral nature fail to give a tight adhesion to or absorption by such colloid systems as fibers of textiles and felts.

On the other hand, waxes and oils, upon being suitably treated by sulphurization, may be made to lose their original electro-chemical neutrality and become active electro-chemical substances, since the sulphur introduced into the molecules of wax or oil has a strong electro-chemical character, and such substances produce the tight adhesion to and absorption by the colloid systems which we have observed. It is assumed that the polar molecules of such absorbed substances have a definite orientation relating to the colloid and form a tight molecular layer as contradistinguished from a loose or unstable layer.

To secure the desired electro-chemical character we prefer to employ sulphurated waxes and oils, since the process of sulphurizing them may not only be simply and easily carried out with readily available materials, but without otherwise altering the physical properties of the oils or waxes except to impart a greatly increased adhesive capacity thereto. Chlorinization, on the other hand, is very energetic and effects a strong change in their physical properties which manifests itself in a change in color, feeling under touch, etc., and moreover is accompanied by the emission of harmful chlorine gas, so that the chlorinization of the oils and waxes is unsuitable for waterproofing textiles and other fine goods.

The sulphurated waxes and oils may be conveniently prepared by dissolving flowers of sulphur or sulphur in powdered form in the waxes and oils by heating. This reaction takes place easily and with oils and fats of organic origin and with paraffins, and a part of the sulphur is eliminated as hydrogen sulphide. The sulphuration of the petroleum oils is more difficult and the introduction of the sulphur into the petroleum oils is somewhat limited but will ordinarily be sufficient for the intended purpose. If a more intense sulphuration of the petroleum oil is required, it may be had by heating the oil to a higher temperature.

We have found that the introduction of sulphur into waxes and oils for the proper waterproofing of textiles and felts can be limited to a small amount as the slightly sulphurated waxes and oils produce very satisfactory waterproofing results.

The physical properties of sulphurated waxes and oils in initial steps of sulphuration are nearly similar to the properties of the original substances. That is to say, sulphurated waxes preserve almost all of their original high melting point and the sulphurated oils preserve almost all of their original viscosity, etc.

In carrying out our invention we prefer to employ mixtures of waxes and oils in which one or both are in sulphurated form, availing of what we have found to be the characteristics of such mixtures whether sulphurated or non-sulphurated. Waxes and solid fatty acids, being solid and stiff substances, tend ordinarily to impart a measure of stiffness to the treated materials. Oils, however, are miscible with melted wax and solid fatty acids in all proportions.

Such mixtures on cooling form solid, semi-solid or soft substances, depending on the concentration of the oil, and when the mixture is properly prepared and applied need not adversely affect the softness, flexibility or pliability of the materials. By "concentration" of the oil is meant that amount of oil (as by weight) in the mixture in proportion to the amount of wax or wax-like substance.

On standing, however, the resultant homogeneous product in certain cases, and unless certain precautions are taken, gives off the oil in the form of drops and the so-called sweating process takes place. The richer the mixture is with oil, the more active becomes the sweating process, and such mixtures soon tend to become oily and tacky. Mixtures, for example, of either paraffin or solid fatty acids alone with oils in high concentration are unstable and soon undergo the sweating process, although they are usable in our process for certain purposes when the concentration of the oil is low.

On the other hand, we have found that through the use of ceresin or beeswax, with or without paraffin or solid fatty acids, in mixture with petroleum oils, soft plastic substances result which are very stable and do not give off the oil through sweating even though the oil concentration is high. Due to this property and to the stability of these mixtures, the sweating process does not take place, the mixtures remain plastic and present no stickiness even in the case of high oil concentration.

We have further found that this property of binding and fixing the oil and yielding a homogeneous and stable product is presented by a mixture of ceresin and paraffin or solid fatty acids, even though the ceresin contained in the mixture is quite low. For example, a mixture of from 5 to 10% of ceresin and 95 to 90% of paraffin is found to bind from one to two times its weight in oil without sweating. In respect to its behavior in mixtures with oils, beeswax appears to present properties similar to those of ceresin, and stearinic acid similar to those of paraffin.

Accordingly, the relative quantities of paraffin, solid fatty acids, ceresin and oil employed by us for treating textiles, felts and other materials are varied, depending on the properties and the intended use of the materials to be waterproofed.

It is to be understood, however, that our invention contemplates the employment as a waterproofing composition a mixture of paraffin or a solid fatty acid alone with a low concentration of oil (one or both of said components being sulphurated) where the softness and lustre of the treated materials are not important. In the event that softness and lustre are important, as, for example, in the manufacture of felt hats and fine textiles, a mixture of ceresin alone with oil may be used, but if paraffin or a solid fatty acid is employed there should be preferably added an amount of ceresin or beeswax in mixture with the oil.

For the wax-like substance we prefer to use ceresin or ceresin and paraffin, although there may be employed for the ceresin also beeswax and for the paraffin solid fatty acids such as stearinic acid.

Paraffin, ceresin and solid fatty acids of the type of stearinic acid are usually highly refined and are very stable in resisting the oxidizing action of the air.

For the oil we prefer to use a petroleum oil and preferably a highly refined viscous oil, such, for example, as an oil having a viscosity represented by not less than 200 to 300 seconds at 100° F. in Saybolt's apparatus.

For fine textiles and felts having delicate or light colors, oils should be used which will not detrimentally affect the coloring. For example, in the case of petroleum oils, use is made in such cases of oils refined up to a white color, as, for example, vaseline white oil, Russian oil, etc.

As solvents for our waterproofing composition we may make use of any suitable volatile but preferably colorless organic compounds which dissolve waxes and solid fatty acids, such as gasoline, benzine, chloroform, carbon tetrachloride, etc. These solvents perform no function beyond dissolving the wax-like substances and should be sufficiently pure and volatile as to become entirely evaporated on drying without leaving any appreciable high boiling ingredients.

In the preparation of the waterproofing composition, the wax-like substance or the oil or both are employed in sulphurated form, which may be reached by the simple process already referred to of heating the wax or the oil, or the mixture of the wax and oil, in the presence of sulphur. The resulting product is then mixed in the proportion selected with a suitable organic solvent. This may be usually carried out with materials at ordinary temperatures, although moderate heating may be employed to accelerate the preparation.

The fluid waterproofing mixture can also be obtained in a state of water emulsion in the presence of certain emulsifying agents and at a certain pH by methods familiar to those skilled in the art.

The preparation of the emulsion is preferably carried out in a special mixer, such as a turbo mixer, with the use of emulsifying agents dissolved in water to facilitate the emulsion or to stabilize it. Such agent, for example, may be sodium stearate or casein and petroleum sulphonic acid. Due to the melting temperature of the waxes, the preparation of the water emulsion is preferably carried out under high temperatures, such, for example, as from 50° to 60° C.

The concentration of the solutions of the waterproofing composition employed will depend upon the method of treatment of the materials to be impregnated. When the materials to be treated are to be dipped or immersed in the waterproofing solution and are to be permitted to dry naturally, a considerably lower concentration should be used than when the drying of the treated materials is hastened by the use of methods involving the forcible removal of the moisture, such as drying by the use of a centrifugal dryer. In such case, the effectiveness of the centrifugal dryer should be taken into account in determining the degree of concentration, the more forceful the removal of the moisture, the higher the concentration which should be used. Drying may be accelerated by the use of heat or air currents to facilitate the removal of the solvent by evaporation. The method of drying used does not require any variation in the strength of the solution, i. e., the amount of solvent employed.

The invention will be better understood by the following specific illustrative examples of various waterproofing mixtures, which may be prepared according to the principles of our invention and intended to be applied by the immersion of the material in the solution, followed by natural drying, the particular weights and volumes given being merely illustrative of the approximate proportions which are preferably used for the purposes indicated.

EXAMPLE 1

*For fine textiles and felts*

Solvent: Straight run gasoline with its end point about 150° C. or chloroform or tetracarbonchloride.

| | | |
|---|---|---|
| Sulphurated ceresin or mixture of one-half sulphurated ceresin and one-half sulphurated paraffin | kilogram | ¼ to 1 |
| Sulphurated white petroleum oil | do | ¼ to 2 |
| Solvent | liters | 100 |

EXAMPLE 2

*For fine textiles and felts emulsion in water*

| | | |
|---|---|---|
| Sulphurated ceresin or mixture of sulphurated ceresin and sulphurated paraffin | kilograms | 1 to 3 |
| Sulphurated petroleum white oil | do | 1 to 6 |
| Sodium stearate | do | ½ |
| Petroleum sulphonic acid | do | ½ |
| Water | liters | 100 |

In the foregoing examples both components of the mixture, the petroleum oil on the one hand and the waxy substance on the other hand, are in sulphurated form. In the event that one component of the mixture is non-sulphurated, the proportion of that non-sulphurated constitutent should be increased. If in the example given, for instance, non-sulphurated oil is employed, the amount of oil should preferably be doubled (making it in Example 1 from ½ to 4 kilograms, and in Example 2 from 2 to 12 kilograms), the amount of the waxy substance remaining the same as stated in each example. And, if the ceresin or ceresin and paraffin is employed in non-sulphurated form, in the examples given, the amount of ceresin or ceresin and paraffin should preferably be doubled (making it in Example 1 from ½ to 2 kilograms, and in Example 2 from 2 to 6 kilograms), the amount of the oil remaining the same as stated in each example.

The examples given are for use with fine textiles, felts or the like. For coarse or loosely woven or fabricated materials the strength of the solution of the waterproofing mixture should be increased to adapt it to the degree of coarseness or looseness, that is to say, a lesser amount of the solvent should be used in proportion to the amount of the mixture of oil and waxy substance.

As previously stated, if paraffin (or stearinic acid) is used alone without ceresin, a low oil concentration should be used. In such a case, for instance, in the examples given, the amount of paraffin should be increased preferably four times that given for the ceresin or ceresin and paraffin (making it from 1 to 4 kilograms in Example 1 and from 4 to 12 kilograms in Example 2), the amount of oil remaining the same.

While the herein described process and composition have application to a wide range of materials and arts, as one example merely, mention may be made of the useful application to waterproofing felt hats. The felt impregnated with our composition becomes waterproof without losing its permeability to air, its pliability, color or lustre, with a sensible improvement in its surface properties and quality of "feel" and with no property of stickiness or tackiness. When the hat is worn, the waterproofing assists in preventing the commonly experienced discoloration of the felt surface due to the running of the dyes under conditions of wetness, and particularly discoloration in and about the hat band due to the penetration of moisture from within ordinarily arising from perspiration. If the hat body is waterproofed in the rough, or during the hat forming process, waterproofing also assists in preventing the bleeding or running of the dyes on the surface of the felt during subsequent hat making steps.

The sweat leather itself of the hat may be usefully waterproofed by our composition, with the result that, when the hats are stacked or nested one on top of another, there is avoided the exudation of oily matter from the leather to the felt or from the felt to the leather which is often experienced and which results in the discoloration of the felt surface of one hat which is nested within another.

Textiles and felts treated with these mixtures in solvents or in water emulsion are evenly waterproofed and retain their original softness, color and permeability to air, with the avoidance of the objectionable stickiness. Additionally, we have observed that in many cases, particularly with certain proportions of certain ingredients in low concentration, the surface properties of textiles and felts, such, for example, as softness and lustre, are materially improved.

Various changes and departures from the embodiment of our waterproofing composition may be made from the proportions and the ingredients herein exemplified, all within the scope and principles of our generic invention, and it is to be understood that the matter hereinbefore set forth is submitted as illustrative and not in a limiting sense.

We claim:

1. The method of producing waterproofing materials for textiles, felts, leathers, and like goods, comprising sulphurating ceresin wax, paraffin wax, and viscous white petroleum oil, by treating with elementary sulphur, and combining together to form a stable non-sweating mixture essentially composed of approximately equal amounts of sulphurated ceresin wax and sulphurated paraffin wax and about 1-2 parts of sulphurated petroleum oil for each part of wax, dispersing the mixture in small percentage in a volatile fluid vehicle.

2. A composition adapted for use in waterproofing textiles, felts and leathers, comprised of a stable non-sweating mixture containing a sulphurated blend of ceresin wax and paraffin wax and at least about an equal amount of a sulphurated viscous refined pertoleum oil, the ceresin wax being in a sufficient amount to prevent sweating, and a volatile fluid vehicle in which said mixture is dispersed in a small percentage to permit of ready application.

3. A composition adapted for use in waterproofing textiles, felts and leathers, comprised of a stable non-sweating mixture essentially composed of approximately equal amounts of sulphurated ceresin wax and sulphurated paraffin wax in combination with about 1-2 parts of a sulphurated viscous white petroleum oil for each part of wax, and a volatile fluid vehicle in which said mixture is dispersed in a small percentage to permit of ready application.

CONSTANTINE F. FABIAN.
ALEXANDER N. SACHANEN.